United States Patent [19]
Knurr

[11] Patent Number: 5,016,949
[45] Date of Patent: May 21, 1991

[54] SWING DOOR AND DOOR FRAME ASSEMBLY

[75] Inventor: Hans Knurr, Kirchheim, Fed. Rep. of Germany

[73] Assignee: Knurr-Mechanik Fur Die Elektronik Aktiengesellschaft, Munich, Fed. Rep. of Germany

[21] Appl. No.: 394,124

[22] Filed: Aug. 14, 1989

[30] Foreign Application Priority Data

Aug. 19, 1988 [DE] Fed. Rep. of Germany ....... 3828288

[51] Int. Cl.$^5$ ............................................. A47B 88/00
[52] U.S. Cl. ..................................... 312/296; 312/329
[58] Field of Search ............... 312/326, 328, 329, 296; 49/501, 504, 398

[56] References Cited

U.S. PATENT DOCUMENTS

| | | | |
|---|---|---|---|
| 1,139,771 | 5/1915 | Kehoe | 49/398 |
| 2,037,413 | 4/1936 | Gloehler | 312/296 X |
| 2,970,347 | 2/1961 | Massopust | 49/501 |
| 4,127,302 | 11/1978 | Green | 49/504 |
| 4,376,354 | 3/1983 | Passovoy | 49/504 |
| 4,607,457 | 8/1986 | Shewchuk | 49/504 X |
| 4,662,108 | 5/1987 | Romero et al. | 49/504 X |

Primary Examiner—Joseph Falk
Attorney, Agent, or Firm—Fleit, Jacobson, Cohn, Price, Holman & Stern

[57] ABSTRACT

A profile frame of a folding door and the associated cabinet-side door frame for a cabinet are described. The profile of the cabinet-side and folding-side vertical beam has a diagonally outwardly open cavity covered on its end faces by bearing eyes arranged on the horizontal beams. The associated door-side vertical beam is provided with an arcuate step extending longitudinally between the bearing eyes and which is integrated in externally flush manner into the recess of the cabinet-side vertical beam. The arcuate step is coaxial to the bearing eyes and receives the hinge bolts located there. The bolt-side vertical beam of the folding door is preferably provided with a swing bolt, which cooperates over the entire length of the vertical beam with a cabinet-side shoulder and which is operated by means of an eccentric bolt.

13 Claims, 3 Drawing Sheets

SWING DOOR AND DOOR FRAME ASSEMBLY

BACKGROUND OF THE INVENTION

The invention relates to a cabinet with a folding door, e.g. for holding electronic components, with a cabinet-side door frame for bounding a door opening, comprising in each case two vertical and horizontal beams with a hollow profile, with a door-side leaf frame articulated to the door frame comprising in each case two door-side vertical and horizontal beams with a hollow profile, as well as with a sealing means passing round within the door gap.

Such cabinets are used in many different technical fields. They can be used for holding electronic, electrical and electromechanical components, their dimensions normally being standardized or following other generally adopted agreements between manufacturers. The 19" system is an example of such a dimensional system. The surfaces are closed with cover plates.

Particularly when used for holding valuable components, every effort is made to seal the cabinet in dust-tight manner. A high frequency shield can also be necessary. For this purpose the contacting faces of engaging parts are provided with a soft sealing material, in order to bridge unevennesses and component tolerances and therefore obtain a closed contact face. This can be improved in that an edge acting on the sealing material is provided in order to locally increase the contact pressure to a significant extent.

Particular attention must be paid to the door gap. Although a number of good solutions has already been found, applications can occur where they are not completely satisfactory. For example certain frame constructions require additional reinforcing elements, in order to prevent the door frame from giving way with a resulting expansion of the door gap. Also in the case of long sealing distances several bolts and hinges must be provided in order to achieve the necessary uniform contact pressure. Separate components require on the one hand additional assembly expenditure and on the other they take up installation space. Hinges mounted on the outside are only securable against unauthorized opening with considerable effort and expenditure. In the case of hinges integrated into the door leaf, the rigidity of the latter is not normally sufficient or greatly adds to the construction depth.

SUMMARY OF THE INVENTION

The object of the present invention is to provide a cabinet of the aforementioned type, in which a uniform contact pressure over the complete sealing length and simultaneously a simple construction are achieved.

According to the invention this is achieved in that the profile of at least the cabinet-side vertical beam arranged on the folding side has an outwardly diagonally open recess, that the vertical beams are provided with a leg arranged in the door gap and having an outwardly directed free end, that the cabinet-side vertical beams at least on the folding side have in each case a hinge bearing eye projecting over the recess of the vertical beam, that at least the profile of the door-side vertical beam arranged on the folding side is provided with a circular recess for receiving hinge bolts which terminates in externally flush manner with the recess of the cabinet-side vertical beam and is located as an extension of the bearing eyes of the horizontal beams, said bolts being passed through the associated bearing eye, that the door-side vertical beams have a mating surface, which in the closed state of the folding door runs parallel to the particular leg of the cabinet-side vertical beams and that the sealing means is positioned between the leg and the mating surface.

Therefore a basic idea of the invention is that the swivel joint of the folding door is integrated into the cabinet-side profile, so that the frame profile stability is increased over virtually the entire sealing frame height. This measure also leads to a uniform contact pressure over the entire sealing length and it is ensured that the frame and the door do not bulge apart between separate hinge points. No installation space is lost, because as a result of the integration the joint parts do not add to the inside or outside. Therefore no space is lost in the internal installation width in the case of sequencing.

Another advantage is that the beams can be mass produced in continuous manner and then, when necessary, cut to the desired length, so that a good sealing action is ensured in the case of different cabinet dimensions.

The manufacture of the profile of the cabinet-side vertical beams is made simpler in that the free leg arranged in the door gap serves as a side wall for the recess. Therefore the recess in principle constitutes a chamber with U-shaped walls.

Access to the interior of the cabinet is facilitated in that the free leg passes from the inside to the outside under a given angle of inclination, preferably 45°, so that the door opening is bevelled and free from sharp corner edges.

The stability and bending resistance of the cabinet-side vertical beams are also increased in that the profile has a tubular core, on which are supported the legs bounding the recess. The pipe length can also be used for receiving pins when fixing transverse beams.

For further simplification and rationalization of profile manufacture, it is appropriate for the bolt-side vertical beams of the cabinet to have the same profile as the folding-side vertical beams and that in addition over the entire length is constructed a shoulder located in the direction of the interior of the cabinet behind the free leg. This shoulder can engage with one or more bolts.

It is optically advantageous for the bolt-side vertical beams that the open chamber present at the folding-side vertical beams is closed by a wall, whose outside shape corresponds to the door-side vertical beam located on the folding side.

The sealing action over the entire sealing surface is ensured on the bolt side in that a swing bolt passing over the entire sealing length is provided and which engages behind the shoulder of the associated cabinet-side vertical beam. The swing bolt can be operated in simple manner in that it cooperates with an eccentric bolt provided with an actuating member.

In order to facilitate the installation and servicing of components in the cabinet, it is advantageous for the hinge bolts to comprise dismantlable, sprung bolts.

In order to prevent unauthorized access to the hinge bolts, it is appropriate for the door-side vertical beams to be covered in the access area of the bolts or the associated bearing eyes. Therefore it is not possible to manipulate the hinge bolts when the door is closed. The hinge bolts can consequently only be removed when the door is swung out.

The invention is described in greater detail hereinafter relative to non-limitative embodiments and the attached drawings.

DESCRIPTION OF THE PREFERRED EMBODIMENT

Figure 1:
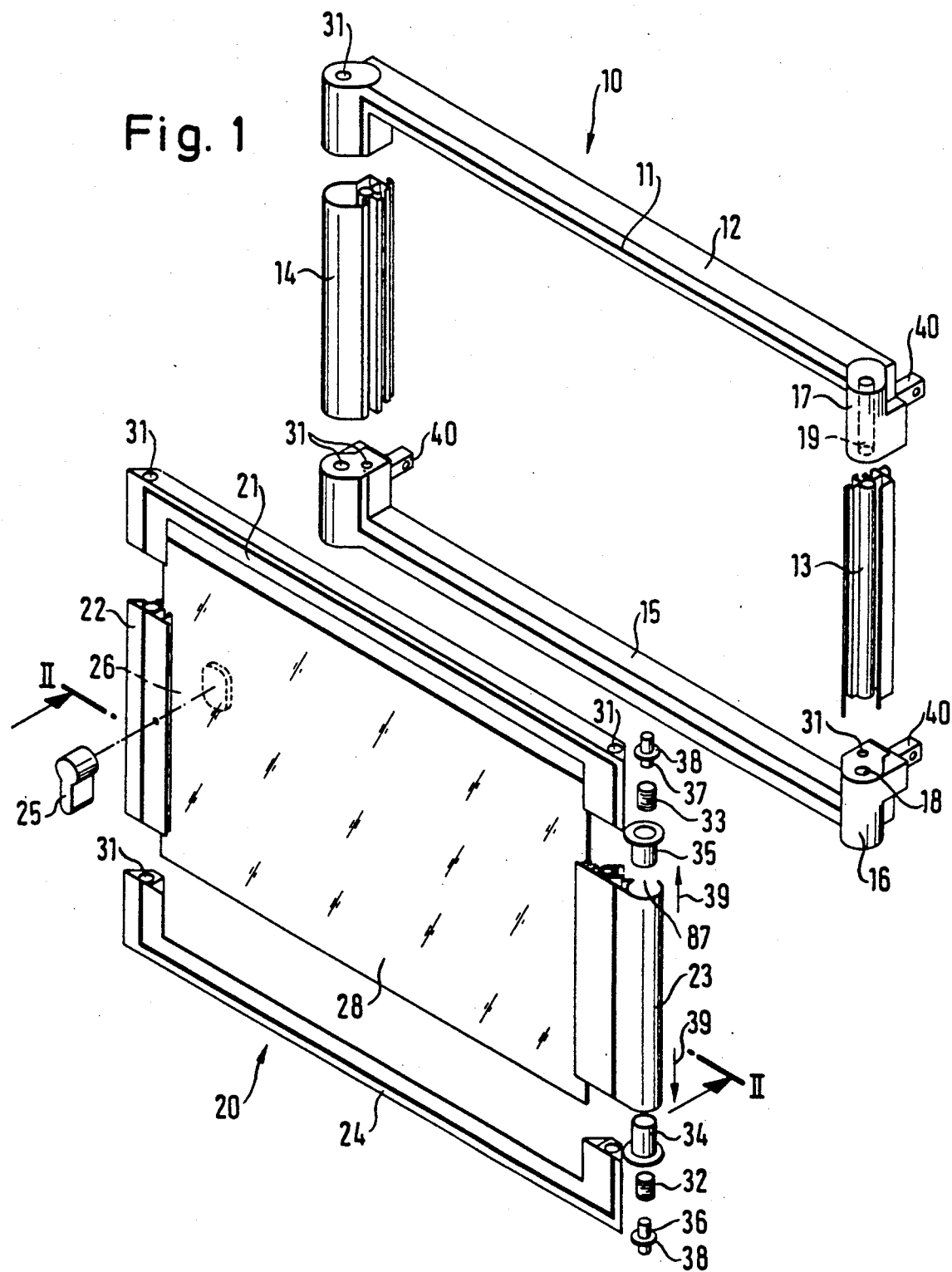
FIG. 1 Diagrammatically shows in a perspective exploded view a frame structure for a door opening and the associated folding door of a cabinet.

The frame construction illustrated in FIG. 1 comprises a cabinet-side frame 10 and an associated, door-side frame 20 for a swing door. In order to make the drawing easy to understand, the side walls of the cabinet are not shown. The frame construction is typically used in the case of a cabinet for receiving valuable components. Wall parts or the like are fixed by means of steps to the cabinet-side frame 10.

The cabinet-side frame 10 comprises an upper horizontal beam 12 and a lower horizontal beam 15, as well as a hinge-side vertical beam 13 and a closure-side vertical beam 14. The door-side frame 20 is constituted by an upper horizontal beam 21, a lower horizontal beam 24, a closure-side vertical beam 22 and a hinge-side vertical beam 23. The aforementioned horizontal beams are in each case connected to the vertical beams by means of a corner butt joint, the horizontal beams projecting over the vertical beams and their end faces engaging on the side of the horizontal beams. The connection is also produced by means of not shown screw bolts or pins. The beams are produced as extruded profiles of metal or flexurally stiff plastic.

The cabinet-side horizontal beams are provided on the side associated with the door stop with a bearing eye or hinge pin socket 16, 17 located in the area projecting over the hinge-side vertical beam 13. The circular openings 18, 19 of the bearing eyes 16, 17 in each case receive a hinge bolt or pin 36 or 37, which is in each case axially resiliently supported by means of a spiral spring 32 or 33, on the door side the hinge bolts 36, 37 are inserted in the bearing sleeves 34, 35, constituting hinge pin seats which are received by the hinge-side vertical beam 23.

Openings in the horizontal beams 12, 15, 21 and 24 are designated 31 and are prepared for bolt connection. These openings are constructed as a screw channel with an internal thread for receiving the screw bolts.

On the cabinet-side frame 10 a sealing strip 11 made from an elastic sealing material passes all round the door gap and in the closed state of the door-side frame 20 is compressed in dusttight manner.

The door-side frame 20 is provided with a door filling 28, which can e.g. comprise transparent plastic, if the need arises to monitor the cabinet content. Otherwise the door filling 28 can be in the form of a metal sheet.

The closure-side vertical beam 22 of the door-side frame 20 contains an actuating device for an eccentric bolt 26 located on the inside of vertical beam 22 and which is constructed as a handle 25. The function of eccentric bolt 26 will be described in greater detail in connection with FIG. 2.

If the door-side frame 20 is articulated on the cabinet-side frame 10, then the spiral springs 32, 33 are relieved and press the hinge bolts 36, 37 axially outwards, being supported on the one hand in the associated bearing sleeves 34, 35 and on the other on disks 38, which are in each case fixed to the hinge bolts 36, 37. In this state part of the hinge bolts 36, 37 projects into the associated openings 19 or 18, whilst the other part is inserted in the hinge-side vertical beam 22 of the door-side frame 20. In order to be able to remove the door-side frame 20 from the cabinet-side frame 10, the hinge bolts 36, 37 can be retracted by axial pressure against arrows 39 through bearing sleeves 34, 35 and against the tension of spiral springs 32, 33 to such an extent that the door-side frame 20 can be removed from the bearing eyes 16, 17. Access to the hinge bolts 37, 38 is provided via a longitudinal slot 87 in the door-side vertical beam 23, which is only accessible when the door is open.

The same parts are given the same reference numerals in the following drawings.

Figure 2:
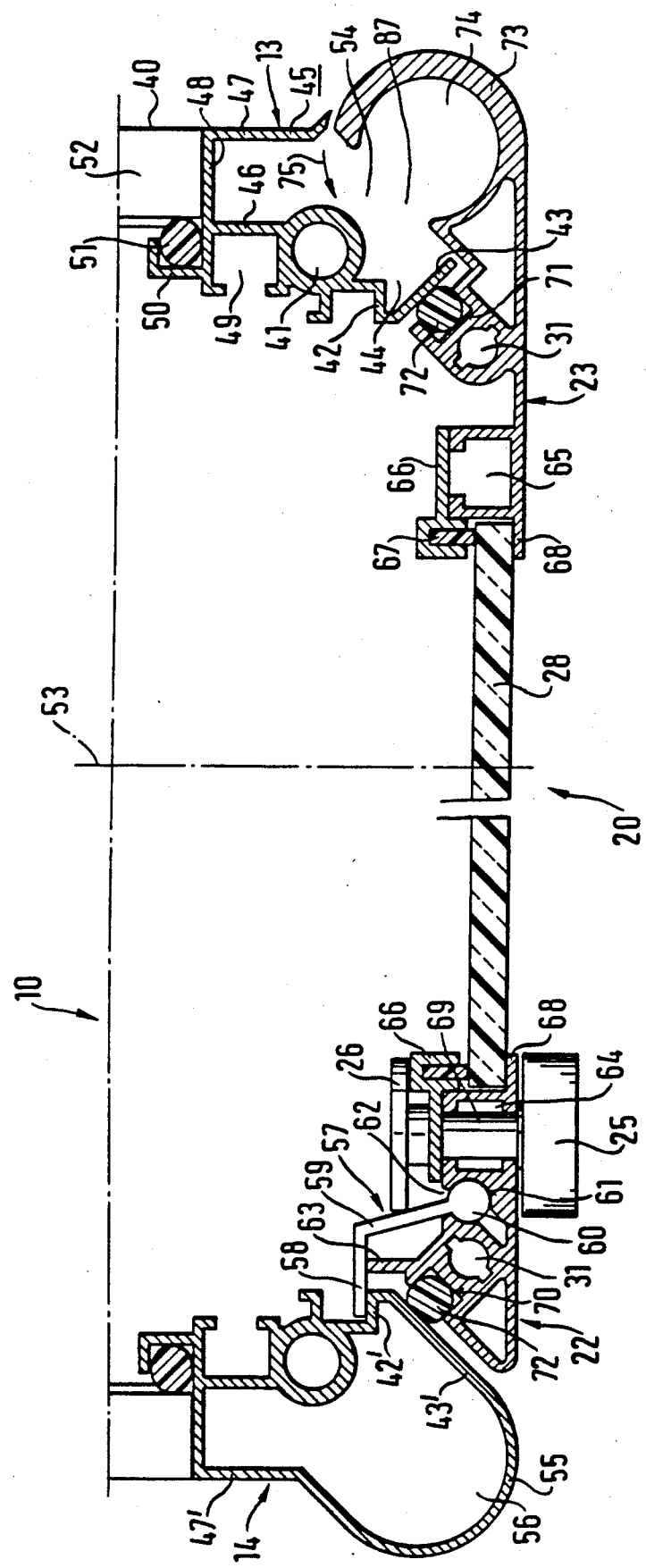
FIG. 2 Diagrammatically shows a horizontal cross-section through a first embodiment of a frame construction along section line II—II in FIG. 1.

According to FIG. 2, the hinge-side vertical beam 13 on the cabinet-side has a hollow profile, a pipe length 41, an external shoulder 42 which extends into the interior of the cabinet, a leg constructed following on to the outer shoulder 42 arranged in the door gap and whose free end is directed outwards, as well as a diagonally outwardly opened recess 44, which is bounded on one side by leg 43 constituting a front wall. Recess 44 is also bounded by a U-piece 45, which is attached with an inner leg on pipe length 41 and whereof the free end of its outer leg or rear wall 47 faces leg 43. Steps 40 are provided on the intermediate member 48 connecting inner leg 46 and outer leg 47. A T-groove 49 is formed in the lateral, inwardly directed extension of inner leg 46 and in same can be anchored sliding nuts for fixing cabinet subdivisions, partitions or the like. One leg of the T-groove 49 is also connected to an L-shaped rail portion 50 for receiving a first sealing strand 51, which is elastically pressed against a lateral cover plate 52, which is fixed to step 40.

Leg 43 projecting from shoulder 42 is inclined by an angle of approximately 45° with respect to a centre line 53.

The profile of the closure-side vertical beam 14 is constructed in side-inverted manner with respect to the profile of the hinge-side vertical beam 13. In place of the opening 54 formed between leg 43 and U-piece 45, on the bolt side there is an arcuate profile piece 55 for connecting the free ends of legs 43 and 47, so that a closed cavity 56 is formed.

Over the entire length of the closure-side vertical beam 22 of the door is formed a swing bolt 57, which has an approximately L-shaped cross-section with a front and a rear leg 58, 59. In the closed state the front leg 58 engages behind the shoulder 42' of the closure-side vertical beam 14 on the cabinet side. It is brought into and held in this position with the aid of eccentric bolt 26, in that the latter acts on the rear leg 59 of swing bolt 57. For opening purposes eccentric bolt 26 is turned by means of handle 25, so that it is disengaged from the rear leg 59. If the door-side frame 20 is then drawn outwards, i.e. in the plane of the drawing, then the swing bolt 57 can be swung out clockwise, it being guided by means of a cylindrical end 60 in a corresponding circular recess 61 with a slot-like opening 62 in vertical beam 22. In both directions the swinging movement is limited by the edges of opening 62, which act as a stop. In its closed position the front leg 58 is supported over its entire length on a stop 63, which projects freely from the door-side vertical beam 22.

On the facing edges the two door-side vertical beams 22, 23 are provided with T-grooves 64 or 65, which are in the same way as the T-groove 49 formed by two lateral L-legs, accompanied by the formation of a slot opening into the interior of the cabinet. Fastening elements 66 are screwed into these two rails 64, 65 and project from the inside over the edge of the door filling and press same by means of an elastic seal 67 against a support 68 on the inner edge of the door-side vertical beams 22, 23 exerting a holding action. Through the T-groove 64 on the bolt-side vertical beam 22 passes a connecting piece 69 between handle 25 and eccentric bolt 26, the two L-legs of the T-groove 64 laterally supporting the connecting piece 69.

Both in the closure-side and in the hinge-side vertical beams 22, 23 is formed a vertical groove 70, 71, whose openings in the closed state of the folding door face the cabinet-side legs 43, 43' of the vertical beams 13, 14. An elastic sealing strand 72 is arranged in projecting manner in the vertical grooves 70, 71 and is pressed in dust-tight manner against legs 43, 43' in the closed state.

The hinge-side vertical beam 23 on the folding door is provided over its entire length with an arcuate step 73, which in the closed state of the folding door terminates in externally flush manner with the outer leg 47 of the cabinet-side U-piece 45. On the inside the arcuate step 73 forms a circular cavity 74, whose two end faces receive the bearing sleeves 34. The arcuate step 73 or the recess 74 is consequently arranged coaxially to the cabinet-side openings 18, 19 and hinge bolts 36, 37 and is positioned between the bearing eyes 16, 17. On opening the folding door, the free end of the arcuate step 73 passes in accordance with arrow 75 on a circular path into recess 44, the external cylinder formed by the step 73 moving along at a constant distance from the free end of the cabinet-side outer leg 47. During this movement the longitudinal slot 87 between the free end of step 73 and the facing edge becomes accessible, so as to be able to release the hinge bolts.

Figure 3:
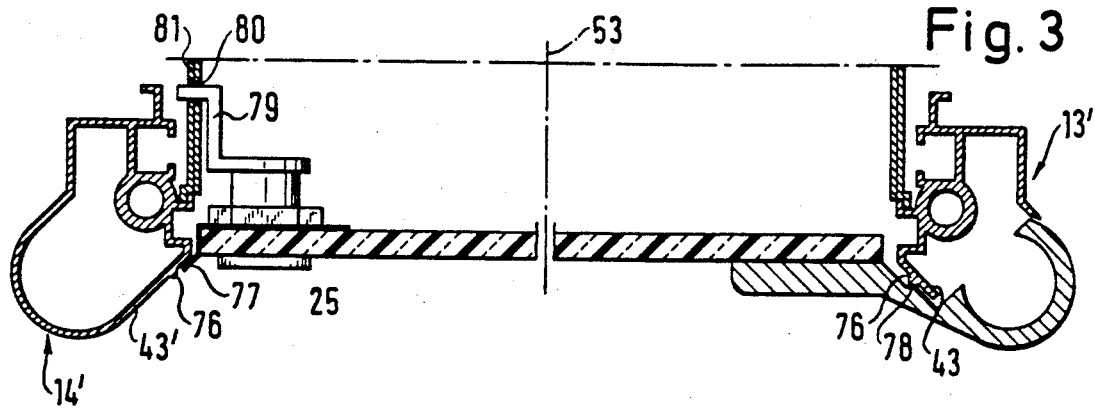
FIG. 3 Diagrammatically shows a horizontal cross-section through a second embodiment of a frame construction.

FIG. 3 illustrates that the free leg 43, 43' of the two cabinet-side vertical beams 13', 14' is provided with an edge 76 extending over the entire length of the beam. When the folding door is closed, said edge 76 is in positive, sealing engagement with a door-side spring contact strip 77 (on the bolt side) and a step 78 (on the door-side folding side).

In the case of FIG. 3, a swing bolt is replaced by a pivot bolt 79, which cooperates with a recess 80 in a cabinet-side wall part 81.

Figure 4:
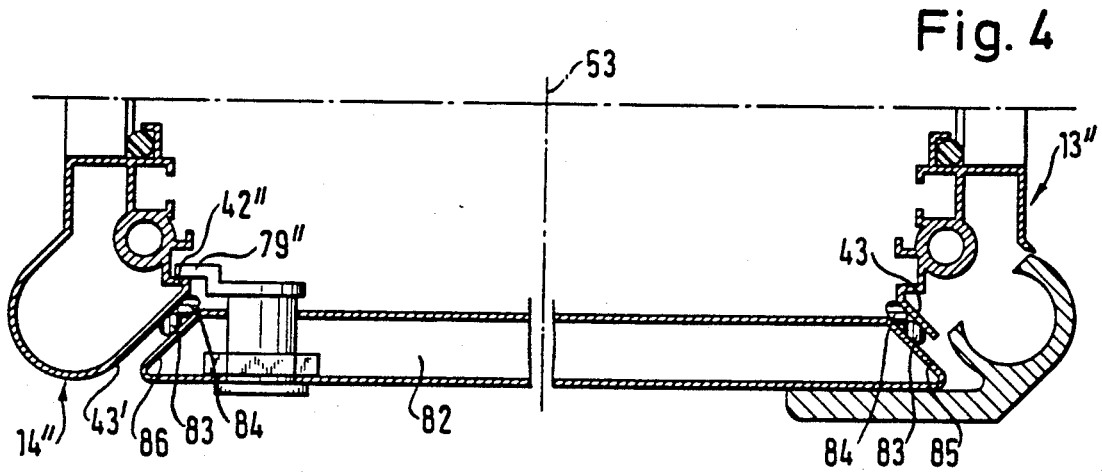
FIG. 4 Diagrammatically shows a horizontal cross-section through a third embodiment of a frame construction.

According to FIG. 4 on the door-side and hinge-side vertical beam 13'', 14'' is provided a folding door 82 constructed as a hollow profile and which can be locked by means of a pivot bolt 79''', which engages behind the shoulder 42'' of the cabinet-side vertical beam 14''. The hollow profile of folding door 82 is bevelled on its narrow sides parallel to the path of the cabinet-side free legs 43, 43'. Two juxtaposed sealing strands 83, 84 are arranged on the bevels 85, 86 of folding door 32 for bridging unevennesses and component tolerances.

Figure 5:
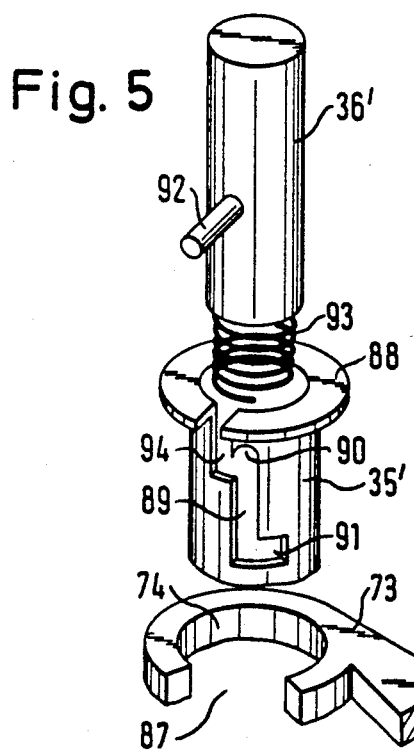
FIG. 5 Diagrammatically shows in a perspective exploded view an alternative construction of a bearing sleeve and an associated hinge bolt.

FIG. 5 illustrates an alternative for the detachable hinge bolt arrangement, as described in conjunction with FIG. 1. FIG. 5 describes the arrangement associated with the top of the door. At its upper edge the bearing sleeve 35' is provided with an outwardly projecting ring 88 with which it is supported on the edge of the door-side arcuate step 73 in the axial direction, when the tubular part of sleeve 35' is inserted in the door-side recess 74. Unlike in the case of the example described in FIG. 1, the tubular part of sleeve 35' is provided with an axially directed slot 89, which is provided on its lower edge with a circumferentially directed transverse slot 91 for forming a locking edge. Slot 89 and transverse slots 91 are used for receiving a radial pin 92 on hinge bolt 36'. By means of the radial pin 92, hinge bolt 36' can be axially moved in the bearing sleeve 35', in that the radial pin 92 is moved manually in slot 89. The hinge bolt 36' is fixed in its lower end position by rotation in transverse slot 91. The hinge bolt 36' is held by means of an upper stop 90 in a position in which it projects over the bearing sleeve 35', so that it can engage in a corresponding cabinet-side hinge part. In a position given by the transverse slot 91, the hinge bolt 36' terminates flush with ring 88, so that the associated door can be disengaged from the cabinet side and removed. The hinge bolt 36' is axially pretensioned by a spiral spring 93, which is supported in the bearing sleeve 35' and which ensures that the hinge bolt 36' is reliably held by force closure in its two end positions between radial pin 92 and bearing sleeve 35'. Slot 89 with its transverse slot 91 and stop 90, as well as the radial pin 92 are located in the vicinity of the door-side longitudinal slot 87 in the assembled state. Therefore they are not accessible from the outside when the door is closed. Therefore it is only possible to move hinge bolt 36' when the door is open and when the door-side longitudinal slot 87 is accessible from the outside.

For assembling the hinge bolt arrangement an assembly slot 93 is provided in the bearing sleeve 35', by means of which the radial pin 92 can be moved into slot 89 during a longitudinal movement of hinge bolt 36'.

What I claim is:

1. A swing door assembly for a cabinet comprising a cabinet frame defining a door jamb and a peripheral door frame for supporting a door on the jamb, a cabinet frame comprising first upper and lower horizontal beams interconnected with a first hinge side hollow profile vertical beam at one end of the cabinet frame to which the door is hinged and a first closure-side hollow profile vertical beam at an opposite end of the cabinet frame, the door frame also comprising upper and lower horizontal beams interconnected with a second hinge side hollow profile vertical beam at one end of the door frame which is hinged to the cabinet and a second closure-side hollow profile vertical beam at an opposite end of the door frame, the second hinge side hollow profile beam having an elongate portion defining upper and lower hinge pin seats, upper and lower hinge pins received in the respective hinge pin seats, hinge pin retaining sockets formed on the first upper and lower horizontal beams respectively at said one end of the cabinet frame for receiving the respective hinge pins, the first hinge side hollow profile beam having front and rear walls defining therebetween an outwardly open recess for receiving said elongate portion of the second hinge side hollow profile beam when the door is opened, the second hinge side hollow profile beam having a wall portion adjacent said elongate portion for approaching said front wall of the first hinge side hollow profile beam when the door is closed and a sealing bead on one of the front wall and the wall portion for sealing against the other of said front wall and wall portion.

2. An assembly as claimed in claim 1 wherein said rear wall of the first hinge-side hollow profile beam extends substantially in parallel with a side wall of the cabinet and said front wall of the first hinge side hollow profile beam extends substantially at 45 degrees to said rear wall.

3. An assembly as claimed in claim 1 wherein the first closure side hollow profile beam is substantially a mirror image of the first hinge side hollow profile beam except that in the case of the closure side beam the respective front and rear walls are interconnected by a convex wall.

4. An assembly as claimed in claim 3 wherein the closure side beam is formed with a shoulder behind the front wall for engaging a swing bolt on the door constituting a closure means for releasibly retaining the door in closed position against the cabinet frame.

5. An assembly as defined in claim 1 wherein the hinge pins are mounted in said hinge pin seats on compression springs releasably urging the hinge pins into the hinge pin sockets.

6. An assembly as defined in claim 1 wherein the elongate portion of the second hinge side vertical beam has an opening extending down one side for obtaining access to the respective hinge pins and releasing same from the hinge pin sockets when the door is open, said opening facing into said recess in the first hinge side vertical beam when the door is closed to preclude access to the hinge pins and said opening being exposed when the door is opened.

7. A frame assembly for mounting a swing door on a cabinet comprising a cabinet frame defining a door jamb and a door frame for mounting on the jamb, the cabinet frame comprising first upper and lower horizontal beams connected with a first hinge side vertical beam and a first closure-side vertical beam to form an enclosed rectangular frame, the door frame comprising second upper and lower horizontal beams connected with a second hinge side vertical beam and a second closure side vertical beam to form a further enclosed frame, the second hinge side vertical beam including a hollow vertical portion defining upper and lower hinge pin seats with respective hinge pins mounted in said seats, and the first upper and lower horizontal beams being provided with respective hinge pin sockets for receiving the respective hinge pins, the hinge pin sockets being located in juxtaposition to the first hinge side vertical beam.

8. An assembly as claimed in claim 7 wherein the hinge pin sockets are integral with the first upper and lower horizontal beams.

9. An assembly as claimed in claim 8 wherein the respective beams are screwed together.

10. As assembly as claimed in claim 8 wherein the hinge pins are carried on compression springs in the respective hinge pin seats for releasably urging the hinge pins into engagement in the respective hinge pin sockets.

11. An assembly as claimed in claim 8 wherein the hinge pins have a bayonet-type mounting in the respective hinge pin seats each with a first setting releasably securing the respective hinge pin in an extended position relative to the seat and a seocnd setting releasably securing the hinge pin in a retracted position in the seat against the action of the spring.

12. An assembly as claimed in claim 8 wherein the first hinge side vertical beam has a substantially centrally located tubular portion with front and rear walls extending from the tubular portion, said front and rear walls having respective free ends defining an opening to a recess in the first hinge side vertical beam in which recess the hollow vertical portion of the second hinge-side vertical beam is received when the door is opened.

13. An assembly as claimed in claim 12 wherein the second hinge side vertical beam has a wall portion adapted to approach the front wall of the first hinge side vertical beam when the door is closed and a sealing bead is provided on one of said front wall and wall portion for engagement with the other of said front wall and wall portion.

* * * * *